United States Patent
Barkley

[11] Patent Number: 5,996,764
[45] Date of Patent: Dec. 7, 1999

[54] ARRANGEMENT FOR SUPPORTING ROLLERS IN A ROLLER CONVEYOR

[75] Inventor: Paul E. Barkley, Sykesville, Md.

[73] Assignee: AMBEC, Inc., Owings Mills, Md.

[21] Appl. No.: 09/069,185

[22] Filed: Apr. 29, 1998

[51] Int. Cl.[6] ................................................ B65G 13/00
[52] U.S. Cl. ......................................................... 193/35 R
[58] Field of Search ........................... 193/35 R; 198/780, 198/860.3

[56] References Cited

U.S. PATENT DOCUMENTS

| | | | |
|---|---|---|---|
| 2,179,047 | 11/1939 | McMurry | 214/84 |
| 2,447,442 | 8/1948 | Tweedale et al. | 60/53 |
| 2,923,391 | 2/1960 | Hewitt, Jr. | 193/35 |
| 3,509,978 | 5/1970 | Bedford | 193/35 |
| 3,869,031 | 3/1975 | Coleman et al. | 193/35 R |
| 3,951,255 | 4/1976 | Shuttleworth et al. | 189/127 R |
| 4,006,816 | 2/1977 | Werntz | 198/781 |
| 4,079,644 | 3/1978 | Hoke et al. | 83/88 |
| 4,313,536 | 2/1982 | Fauth | 198/781 |
| 4,469,220 | 9/1984 | Becker | 198/781 |
| 4,681,203 | 7/1987 | Kornylak | 193/35 R |
| 4,693,356 | 9/1987 | Pi-May | 193/35 TE |
| 5,038,923 | 8/1991 | Evans | 198/781 |
| 5,082,109 | 1/1992 | Blondeau | 198/781 |
| 5,311,983 | 5/1994 | Clopton | 198/860.1 |
| 5,517,798 | 5/1996 | Klopfenstein | 53/249 |

*Primary Examiner*—William E. Terrell
*Assistant Examiner*—Khoi H. Tran
*Attorney, Agent, or Firm*—Evenson, McKeown, Edwards & Lenahan, P.L.L.C.

[57] ABSTRACT

An arrangement for supporting rollers in a roller conveyor includes at least three support rails arranged parallel to each other. The support rails define a set of holes aligned coaxially with each other. A bearing block is arranged on an intermediate one of the support rails. The bearing block includes a base strip defining a groove extending in a longitudinal direction along a lower side, and defining a hole extending in a lateral direction. An upper portion of the intermediate support rail is disposed in the groove and the hole is aligned coaxially with the set of holes in said support rails. A plurality of bearing supports extending from an upper side of the base strip. Each of the bearing supports defines a bearing surface extending in the lateral direction. Adjacent ones of the bearing supports are spaced apart from each other in both the longitudinal direction and the lateral direction. A support shaft extends through the hole in the bearing block and the corresponding set of holes in the support rails.

10 Claims, 4 Drawing Sheets

ARRANGEMENT FOR SUPPORTING
ROLLERS IN A ROLLER CONVEYOR

BACKGROUND AND SUMMARY OF THE
INVENTION

This invention relates to an arrangement for supporting rollers in a roller conveyor, and more particularly to a bearing block for supporting rollers and the connection of the bearing block to supporting rails.

Roller conveyors having a plurality of rollers rotatably supported by bearing blocks are known, for example, from U.S. Pat. No. 4,313,536 to Fauth, the entire disclosure of which is expressly incorporated by reference herein.

Fauth shows in FIG. 5 a bearing member 34 having a plurality of openings 60 defining bearing surfaces 62. As shown in FIGS. 7 and 8 thereof, the bearing member 34 is supported via a support member 30 and pins 48 arranged in holes in the support member 30. The support member 30 is disposed in a slot 50 running longitudinally along the lower side of the bearing member 34. Legs 44 and 46, which are resilient due to the nature of the material of which the bearing member is made, are clamped over pin 48.

In certain situations, particularly in the case of a bearing block having laterally offset bearing surfaces, twisting moments or torques may be produced on the bearing member relative to its longitudinal axis. The bearing member and the connecting structure to the supporting member must be designed to absorb or avoid such torques, in order to prevent stresses and/or vibrations which could lead to breakdown or failure. In Fauth, while the open clamping legs 44, 46 allow easy connection of the bearing member 34 to the supporting member 30, this connection provides limited support with respect to the torques about the longitudinal axis, due to the resilience of the legs which allows the legs to move with respect to the pin 48, providing limited resistance to torques about the longitudinal axis. The resistance to torques may be further limited due to tolerances between the pin 48 and the hole in the supporting member 30 in which the pin is disposed, allowing the pin to twist to a certain extent when a torque is induced on the bearing member.

In view of the above, there is a need for an arrangement for supporting rollers in a roller conveyor which will avoid or withstand torques on a bearing block which supports the rollers.

The above-mentioned and other needs have been met by the present invention by providing a bearing block for supporting a plurality of rollers in a roller conveyor, comprising: a base strip defining a groove for receiving a support rail in an assembled position, said groove extending in a longitudinal direction along a lower side, said base strip defining at least one laterally extending hole to be aligned with a corresponding hole in said support rail for receiving a support shaft in said assembled position; and a plurality of bearing supports extending from an upper side of said base strip, each of said bearing supports defining a bearing surface for receiving a roller shaft, said bearing surface extending in said lateral direction, adjacent ones of said bearing supports being spaced apart from each other in said longitudinal direction, adjacent ones of said bearing supports being offset from each other in said lateral direction.

The above-mentioned and other needs have also been met by the present invention by providing an arrangement for supporting rollers in a roller conveyor, comprising: at least three support rails arranged parallel to each other, said support rails defining at least one set of holes aligned coaxially with each other; a bearing block including a base strip defining a groove extending in a longitudinal direction along a lower side, said base strip defining at least one hole extending in a lateral direction, said bearing block being arranged on an intermediate one of said support rails such that a portion of said intermediate support rail is disposed in said groove and said at least one hole is aligned coaxially with a corresponding one of said sets of holes in said support rails, a plurality of bearing supports extending from an upper side of said base strip, each of said bearing supports defining a bearing surface extending in said lateral direction, adjacent ones of said bearing supports being spaced apart from each other in said longitudinal direction, adjacent ones of said bearing supports being offset from each other in said lateral direction; a support shaft extending through each of said holes in said bearing block and the corresponding one of said sets of holes in said support rails, respectively.

The above-mentioned and other needs have also been met by the present invention by providing a roller conveyor comprising: at least three support rails arranged parallel to each other, said support rails defining at least one set of holes aligned coaxially with each other; a bearing block including a base strip defining a groove extending in a longitudinal direction along a lower side, said base strip defining at least one hole extending in a lateral direction, said bearing block being arranged on an intermediate one of said support rails such that said intermediate rail is disposed in said groove and said at least one hole is aligned with a corresponding one of said set of holes in said support rails, a plurality of bearing supports extending from an upper side of said base strip, each of said bearing supports defining a bearing surface extending in said lateral direction, adjacent ones of said bearing supports being spaced apart from each other in said longitudinal direction, adjacent ones of said bearing supports being offset from each other in said lateral direction; a support shaft extending through each of said holes in said bearing block and the corresponding set of holes in said support rails; a roller shaft arranged in engagement with each of said bearing surfaces, respectively; and at least one roller sleeve mounted on each of said roller shafts.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF PREFERRED
EMBODIMENTS

Figure 1:
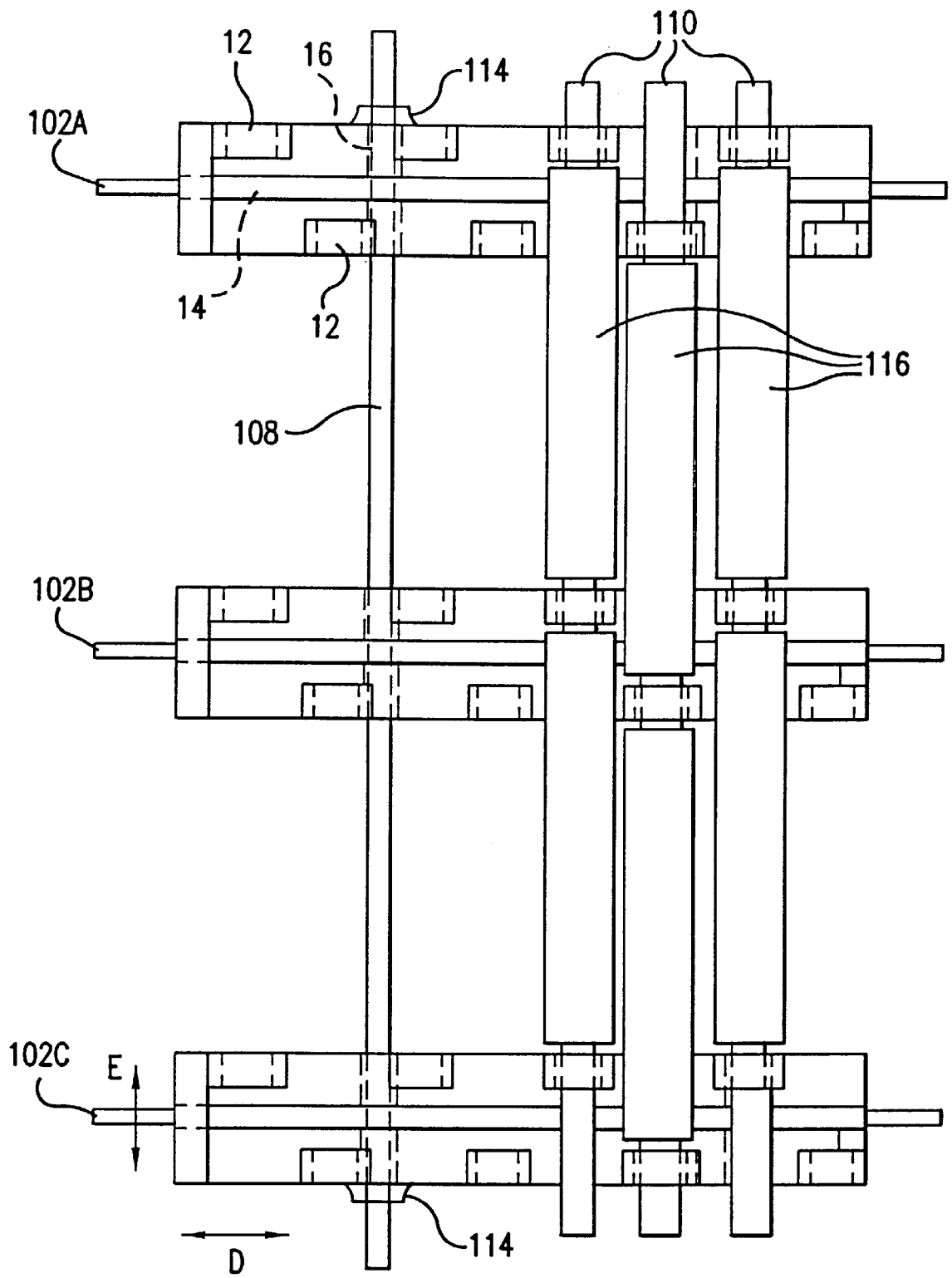
FIG. 1 is a top plan view of an arrangement for supporting rollers in a roller conveyor according to a preferred embodiment of the present invention.
Figure 2:
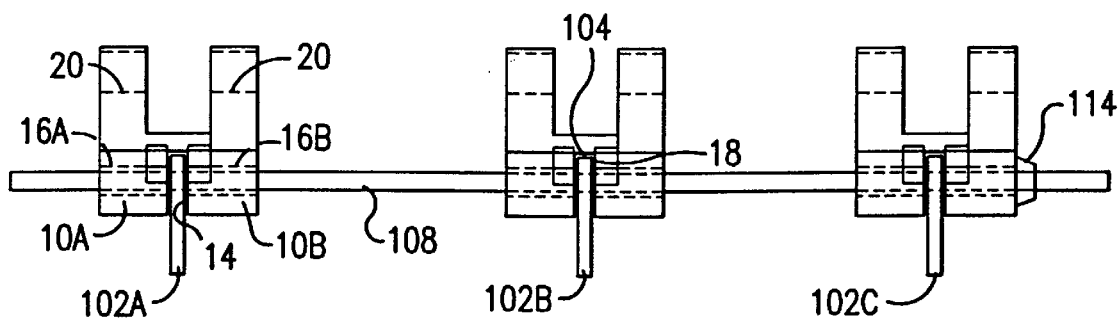
FIG. 2 is an end view of the bearing blocks and support rails of FIG. 1.
Figure 3:
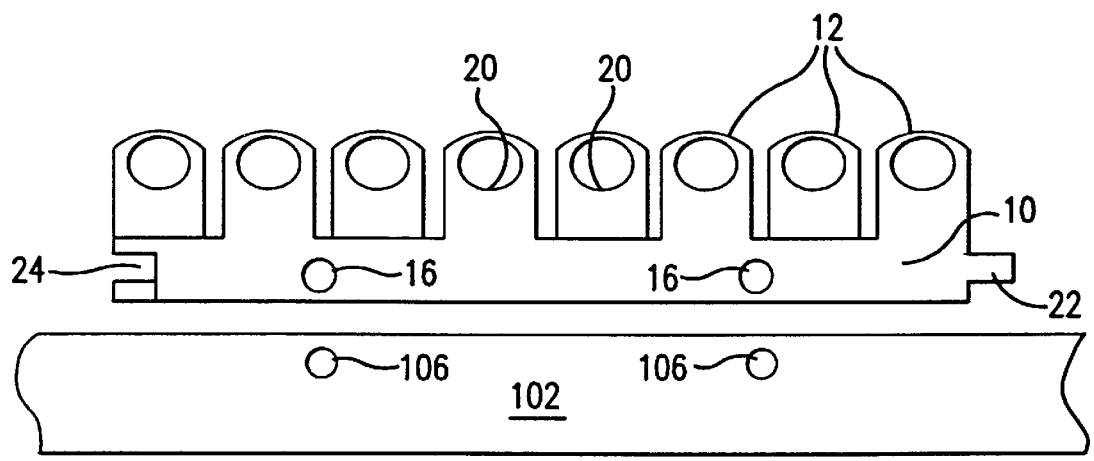
FIG. 3 is a side view of a bearing block and a support rail of FIG. 1 in an unassembled position.

Referring to FIGS. 1–3, a bearing block includes an essentially parallelepiped-shaped base strip 10 with a plurality of bearing supports 12 extending upwardly therefrom. The bearing block may be manufactured from any suitable material well-known in the art, for example acetal, PTB, polytetrafluoroethylene, nylon, polypropylene, thermoplastics, or bronze. Furthermore, the bearing block may be manufactured in any suitable manner well-known in the art, for example by injection molding or by machining.

Longitudinal ends of the base strip 10 are configured to matingly fit together with adjacent bearing blocks, for example with a tongue 22 at one end and a groove 24 at the other end. The base strip 10 defines a groove 14 extending longitudinally along a lower side thereof, dividing the base strip into first and second legs 10A, 10B. The base strip 10 defines spaced-apart holes 16 extending laterally therethrough and intersecting with the groove 14. The holes 16 include a first hole 16A extending from a lateral edge of the base strip to the groove 14 in the first leg 10A, which is aligned coaxially with a second hole 16B extending from the groove 14 to an opposite lateral edge of the base strip in the second leg 10B.

In the assembled position shown in FIGS. 1 and 2, the bearing blocks are mounted on respective support rails 102A, 102B, 102C, which are arranged parallel to each other. The support rails are disposed in the groove 14, with an upwardly facing surface 104 of each support rail 102 engaging a downwardly facing surface 18 of the base strip 10 in the groove 14. The legs 10A, 10B extend downwardly along opposite lateral sides of the support rails 102. Holes 106 are formed extending laterally through the support rails 102, the holes 106 being positioned to be aligned with the holes 16 in the base strip 10 when in the assembled position. A support shaft 108 is placed through each set of aligned holes 106, 16. The support shaft 108 is fixed in place, for example via nuts 114 threaded onto ends of the support shaft. Although the illustrated embodiment shows two holes 16 and two support shafts 108, any number of holes and corresponding support shafts may be provided, depending upon various parameters including the length of the bearing block, the materials used, manufacturing tolerances, and the support required.

The bearing supports 12 each define a bearing surface 20 for supporting a roller shaft 110. Although the bearing surfaces are shown as cylindrical holes in FIGS. 1–6, they may be open toward the top, for example as shown in FIG. 7 by the upwardly facing recesses 20B in bearing supports 12B. As shown on the left side of the instant FIG. 1, where the rollers have not been shown for purposes of clarity, adjacent bearing supports 12 are spaced apart in the longitudinal direction D, as well as in the lateral direction E. As shown on the right side of FIG. 1, sleeves 116 are mounted on the roller shafts 110 between the bearing supports 12. The sleeves 116 form an essentially planar support surface for conveying objects in direction D.

The lateral offset of successive bearing supports 12 in direction E allows the sleeves 116 to be laterally offset as well, avoiding a straight line gap between roller sleeves. It is important to avoid such a straight line gap, specifically along intermediate support rail 102B, since such a gap could cause conveyed objects to stick therein. Although identical bearing blocks with laterally offset bearing supports 12 are shown on outer rails 102A and 102B, those bearing supports need not be laterally offset, so those bearing blocks may be provided with bearing supports 12 which are all aligned longitudinally.

Due to the lateral offset of the adjacent bearing supports 12, the weight of a conveyed object passing over the rollers 116 may induce torques on the bearing block about its longitudinal axis. The connection of the bearing blocks to the support rails 102 via the support shaft 108 through holes 106, 16 stabilizes the bearing blocks to absorb these torques thereby preventing movements and/or vibrations that could damage the conveyor.

Figure 4:
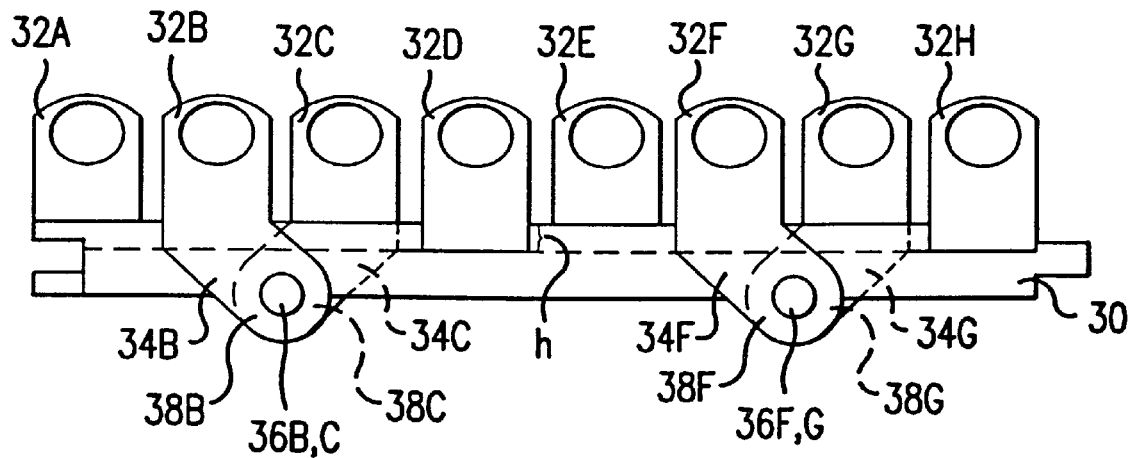
FIG. 4 is a side view of a bearing block according to a preferred embodiment of the present invention.
Figure 5:
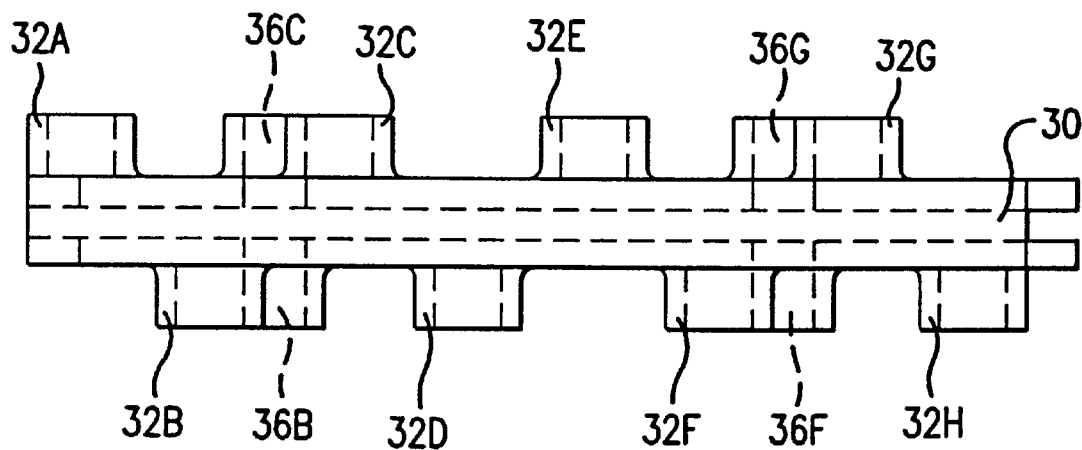
FIG. 5 is a top view of the bearing block of FIG. 4.
Figure 6:
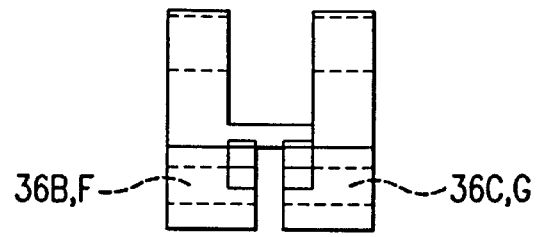
FIG. 6 is an end view of the bearing block of FIG. 4.
Figure 7:
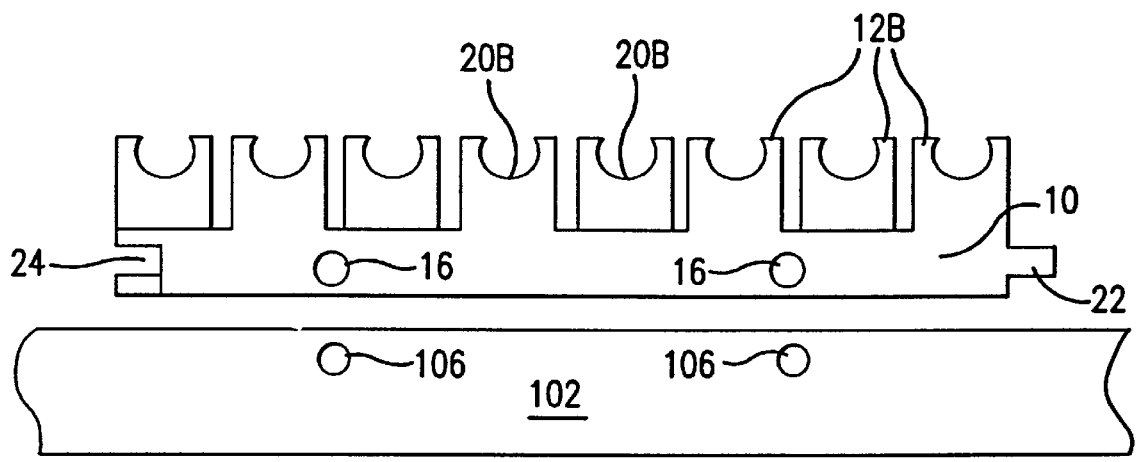
FIG. 7 is a side view of a bearing block similar to FIG. 3 but with bearing surfaces open toward the top.

FIGS. 4–6 shows a preferred embodiment of the bearing block which requires less material to manufacture. A plurality of bearing supports 32A–32H extend upwardly from a base strip 30. Bearing supports 32A, 32D, 32E, 32H extend downwardly only along a portion (h) of the thickness of the base strip 30. The bearing supports 32B and 32C have lower legs 34B, 34C extending obliquely toward coaxial holes 36B, 36C defined in bosses 38B, 38C of the base strip 30. Similarly, the bearing supports 32F and 32G have lower legs 34F, 34G extending obliquely toward coaxial holes 36F, 36G defined in bosses 38F, 38G of the base strip 30. The use and connection to supporting rails of the embodiment of FIGS. 4–6 is identical to that of FIGS. 1–3.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A bearing block for a roller conveyor, comprising:
   a base strip defining a groove extending in a longitudinal direction along a lower side of said base strip and having at least one hole extending there through in a lateral direction; and
   a plurality of bearing supports extending upwardly from said base strip, adjacent ones of said bearing supports being spaced apart from each other in said longitudinal direction and being offset from each other in said lateral direction, and each of said bearing supports defining a bearing surface extending in said lateral direction.

2. A bearing block according to claim 1, wherein each of said bearing supports defines a hole extending therethrough in said lateral direction to form said bearing surface.

3. A bearing block according to claim 1, wherein each of said bearing supports defines an upwardly facing recess extending in said lateral direction to form said bearing surface.

4. A bearing block according to claim 1, wherein alternate ones of said bearing supports in said longitudinal direction are aligned in first and second longitudinal rows, respectively.

5. A bearing block for supporting a plurality of rollers in a roller conveyor, comprising:
   a support rail having at least one hole; a support shaft;
   a base strip defining a groove for receiving said support rail in an assembled position, said groove extending in a longitudinal direction along a lower side of said base strip, said base strip having at least one laterally extending hole to be aligned with a corresponding said hole in said support rail for receiving said support shaft in said assembled position; and
   a plurality of bearing supports extending upwardly from said base strip, adjacent ones of said bearing supports being spaced apart from each other in said longitudinal direction and being offset from each other in said lateral direction, and each of said bearing supports defining a bearing surface for receiving a roller shaft, said bearing surface extending in said lateral direction.

6. A bearing block according to claim 5, wherein each of said bearing supports defines a hole extending therethrough in said lateral direction to form said bearing surface.

7. A bearing block according to claim 5, wherein each of said bearing supports defines an upwardly facing recess extending in said lateral direction to form said bearing surface.

8. A bearing block according to claim 5, wherein alternate ones of said bearing supports in said longitudinal direction are aligned in first and second longitudinal rows, respectively.

9. An arrangement for supporting rollers in a roller conveyor, comprising:

at least three support rails arranged parallel to each other, said support rails defining at least one set of holes aligned coaxially with each other;

a bearing block including a base strip defining a groove extending in a longitudinal direction along a lower side of said bearing block and having at least one hole extending in a lateral direction, said bearing block being arranged on an intermediate one of said support rails such that a portion of said intermediate support rail is disposed in said groove and said at least one hole is aligned coaxially with a corresponding one of said sets of holes in said support rails, a plurality of bearing supports extending upwardly from said base strip, adjacent ones of said bearing supports being spaced apart from each other in said longitudinal direction and being offset from each other in said lateral direction, and each of said bearing supports defining a bearing surface extending in said lateral direction; and a support shaft extending through each of said holes in said bearing block and the corresponding one of said sets of holes in said support rails, respectively.

10. A roller conveyor comprising:

at least three support rails arranged parallel to each other, said support rails defining at least one set of holes aligned coaxially with each other;

a bearing block including a base strip defining a groove extending in a longitudinal direction along a lower side of said bearing block and having at least one hole extending in a lateral direction, said bearing block being arranged on an intermediate one of said support rails such that said intermediate rail is disposed in said groove and said at least one hole is aligned with a corresponding one of said set of holes in said support rails, a plurality of bearing supports extending upwardly from said base strip, adjacent ones of said bearing supports being spaced apart from each other in said longitudinal direction and being offset from each other in said lateral direction, and each of said bearing supports defining a bearing surface extending in said lateral direction; and a support shaft extending through each of said holes in said bearing block and the corresponding set of holes in said support rails;

a roller shaft arranged in engagement with each of said bearing surfaces, respectively; and at least one roller sleeve mounted on each of said roller shafts.

* * * * *